Feb. 28, 1967

W. J. CONOVER 3,306,257

LIVESTOCK PEN ARRANGEMENT

Original Filed March 4, 1963

INVENTOR
WILLIAM J. CONOVER
BY
L. Robert Henderson
ATTORNEY

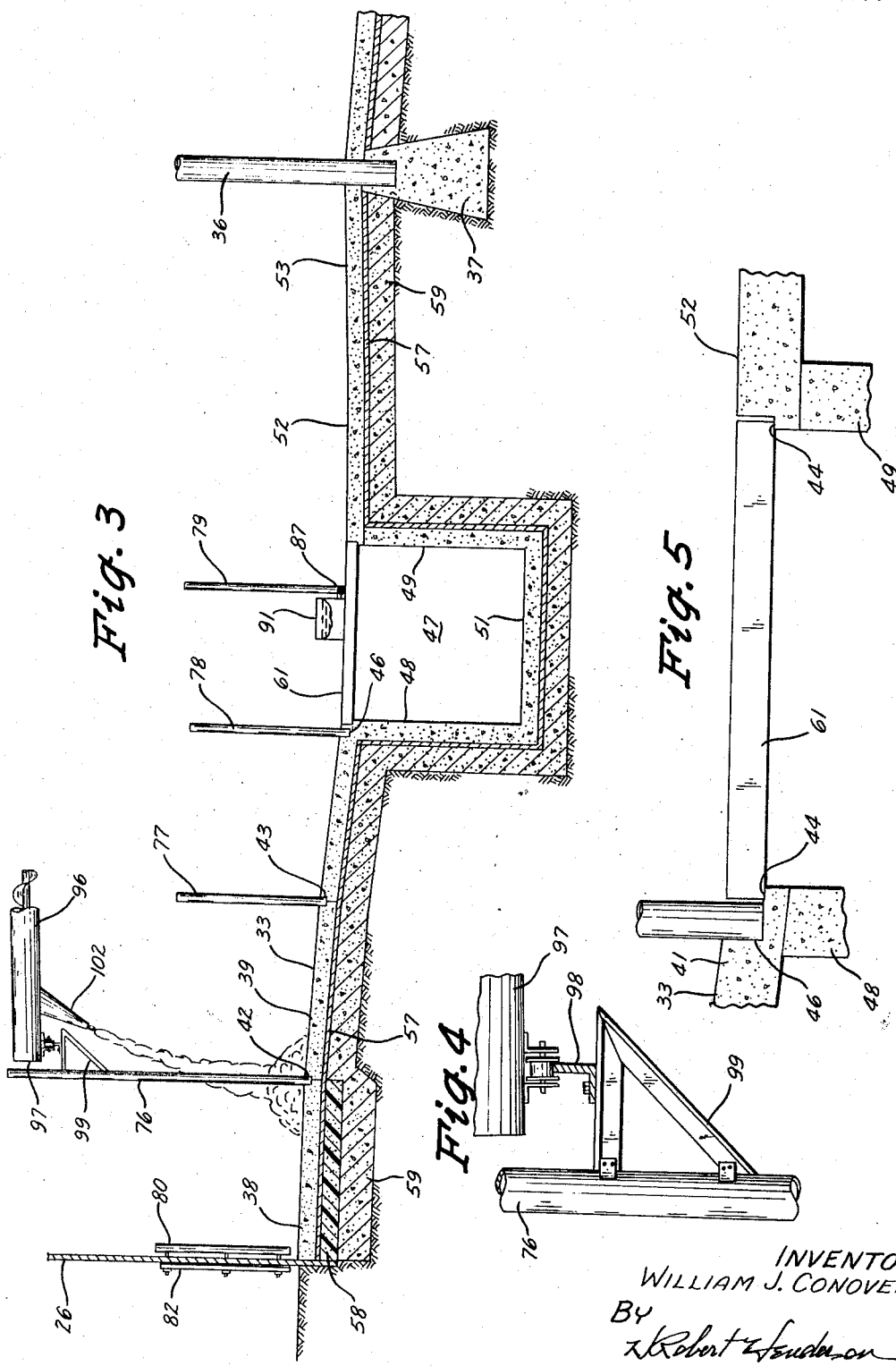

Feb. 28, 1967
W. J. CONOVER
3,306,257
LIVESTOCK PEN ARRANGEMENT
Original Filed March 4, 1963
4 Sheets-Sheet 3
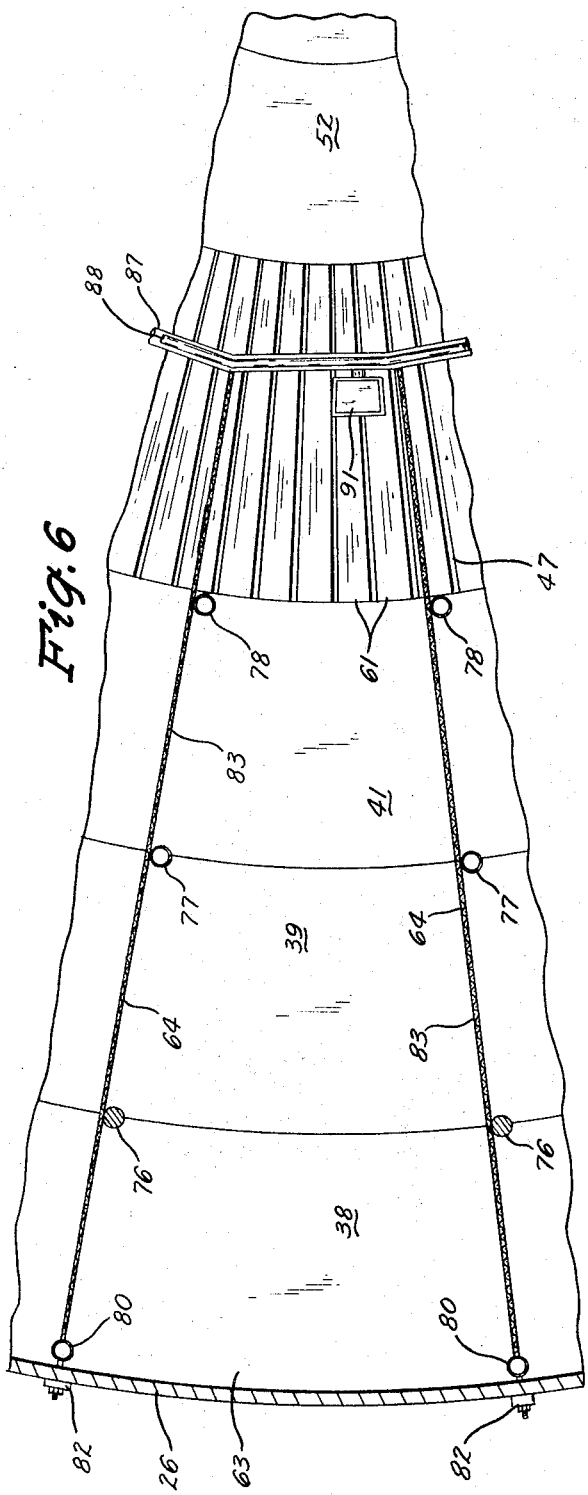
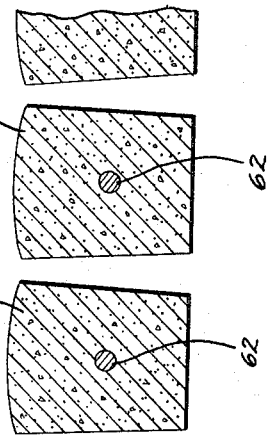
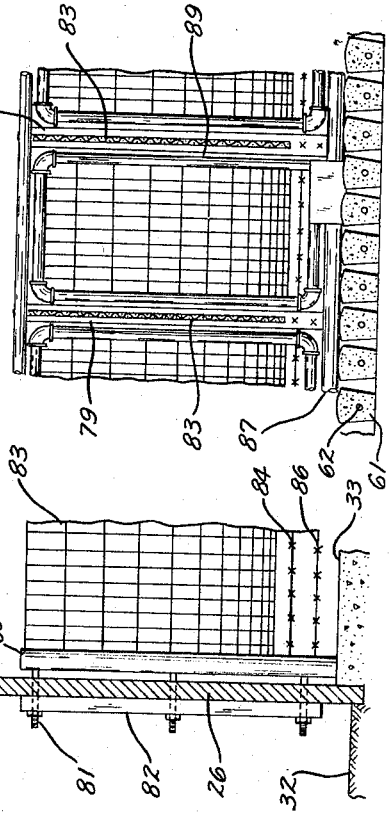
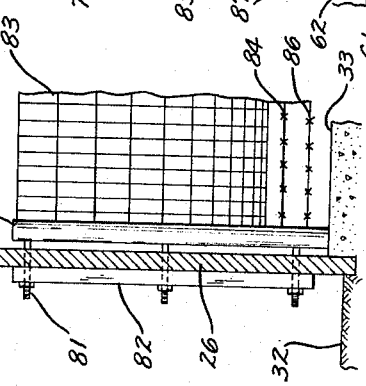
INVENTOR
WILLIAM J. CONOVER
BY
*L. Robert Henderson*
ATTORNEY

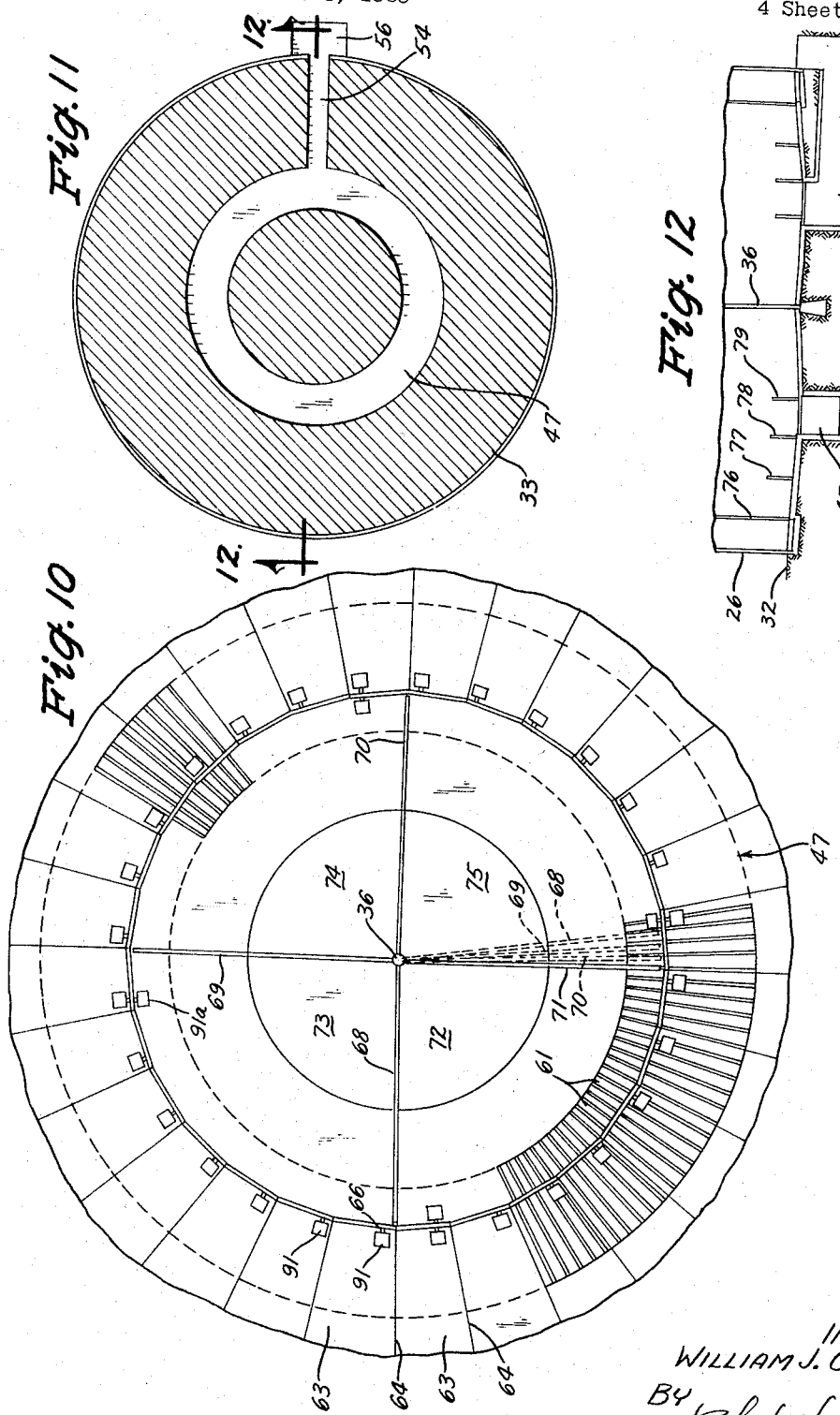

United States Patent Office 3,306,257
Patented Feb. 28, 1967

3,306,257
LIVESTOCK PEN ARRANGEMENT
William J. Conover, Rhodes, Iowa, assignor to Black, Sivalls & Bryson, Inc. (B. S. & B.), Kansas City, Mo., a corporation of Delaware
Original application Mar. 4, 1963, Ser. No. 262,472, now Patent No. 3,148,663, dated Sept. 15, 1964. Divided and this application Aug. 24, 1964, Ser. No. 391,801
3 Claims. (Cl. 119—16)

This application is a division of my copending application Serial No. 262,472 now Patent No. 3,148,663 entitled Farrowing Layout, filed March 4, 1963 and patented Sept. 15, 1964.

This invention relates to new and useful improvements in livestock farms and particularly to a farrowing layout.

It is an object of this invention to provide an improved feed material handling apparatus for discharging material in a circular path.

It is another object of this invention to provide an improved method of removing feed material from a storage bin, for transmitting the feed material to a feeding bin, and for distributing the feed material in a circular path about the floor of the feeding bin.

It is a further object of this invention to provide a farrowing layout which is economical, easily manufactured, readily assembled, and effective.

These objects, and other featured and advantages of this invention will become readily apparent upon reference to the following description, when taken with the accompanying drawings, wherein:

FIG. 3 is an enlarged, fragmentary, vertical sectional view of a radial portion of the farrowing pen as taken along the line 3—3 in FIG. 2;

FIG. 4 is an enlarged fragmentary side elevational view of a portion of the auger boom and track for radially distributing feed to the stalls;

FIG. 5 is an enlarged view of a detail of the sanitation slabwork for the farrowing pen;

FIG. 6 is a top plan view generally of one stall of the farrowing pen;

FIG. 7 is a vertical sectional view taken along the line 7—7 of FIG. 6;

FIG. 8 is a vertical sectional view taken along the line 8—8 in FIG. 6;

FIG. 9 is a vertical sectional view taken along the line 9—9 in FIG. 6;

FIG. 10 is a reduced, top plan view of the circular stall arrangement and showing the maneuverability of the center stall gates;

FIG. 11 is a reduced horizontal sectional view as taken through the entire floor of the farrowing pen; and FIG. 12 is a vertical sectional view as taken along the lines 12—12 in FIG. 11.

Figure 1:
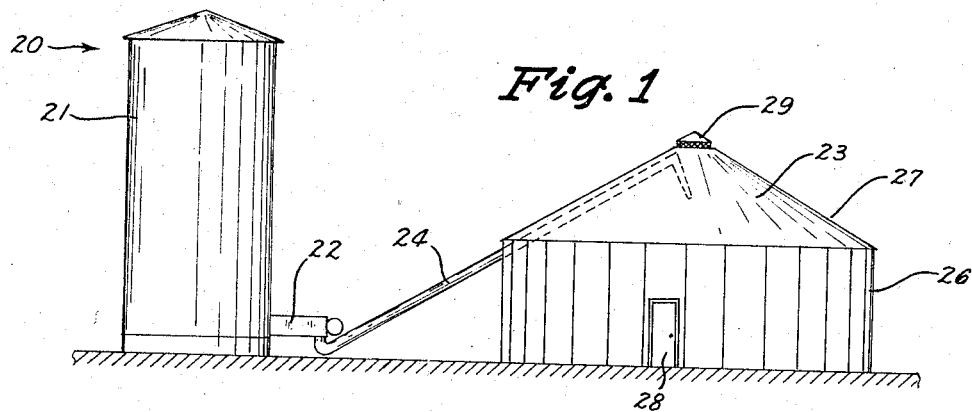
FIG. 1 is a side elevational view of the farrowing layout of this invention.

Referring now to the drawings, the livestock farrowing layout of this invention is indicated generally at 20 in FIG. 1, and comprises basically a storage tank 21, such as one for storing wet shelled corn, and which is provided with a bottom unloading device 22 or the like, and a circular farrowing pen 23. An elevated auger conveyor 24 is adapted at its lower end to receive grain from the unloading device 22 and extends upwardly through the side wall 26 of the pen 23 and beneath the roof 27 of the pen for discharging the grain.

It may be desirable to grind the whole corn and to mix it with protein and other feed supplement prior to elevating it into the farrowing pen 23. Therefore, at the junction of the unloading device 22 and the conveyor 24, one or more bulk tank unloaders and a granular mixing and grinding apparatus can be interposed into the farrowing layout.

The farrowing pen can be of a circular, hollow structure the wall 26 of which is either corrugated or comprised of steel shaves having vertical and/or horizontal seams. A pair of doors 28 are provided in the wall 26 for the entry and exit of both humans and livestock. The roof 27 is depicted as the type used on grain bins, having a top center stack 29 below which a motorized fan 31 is mounted for ventilating the interior of the pen 23.

Figure 2:
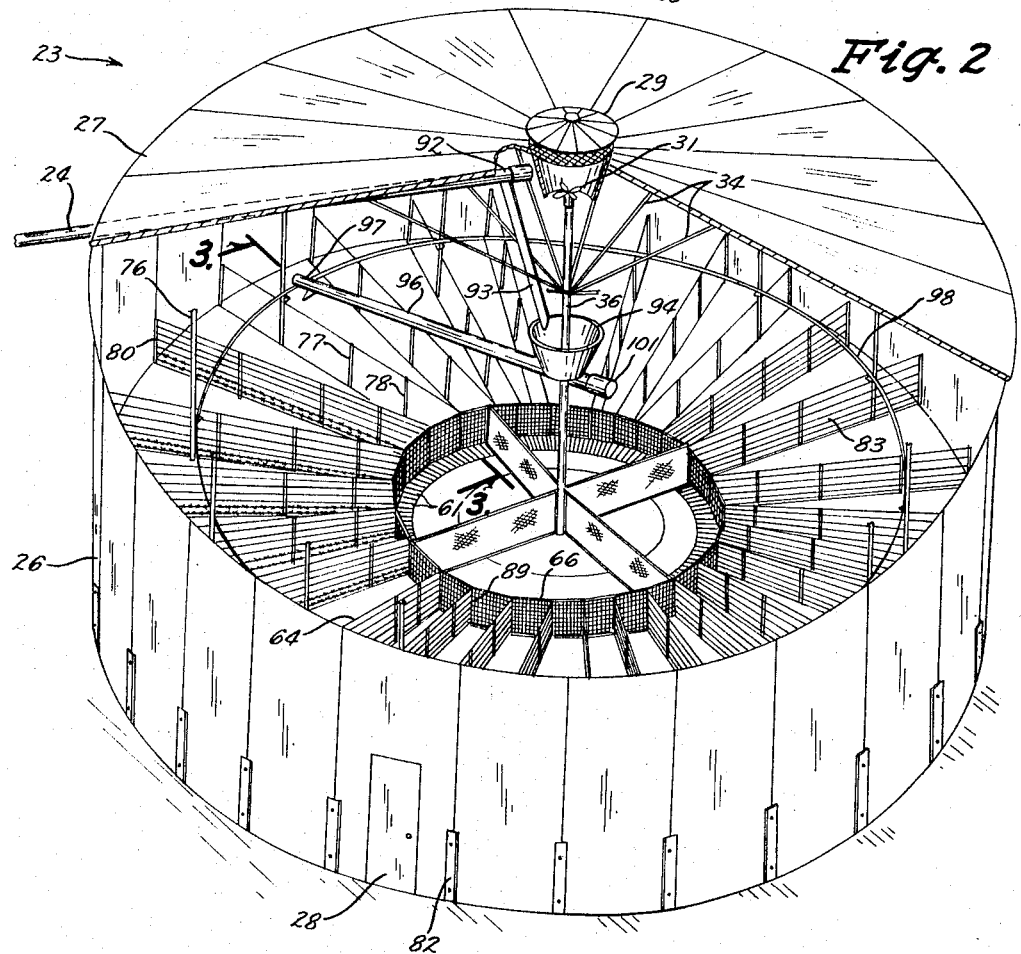
FIG. 2 is a perspective view of the farrowing pen, with a portion of the roof broken away to clearly show the interior thereof.

The farrowing pen 23 is supported above the ground 32 (FIG. 3) by a circular concrete floor 33, and as best illustrated in FIGS. 2 and 3 is supported further by an umbrella type structure 34 extended between the roof 27 and a center pole 36. The pole 36 is secured in a foundation block 37 (FIG. 3) formed in the ground at the center of the pen 23, and which pole 36 extends upwardly through the floor 33.

Referring particularly to FIG. 3, a radial cross section of the floor 33 is shown, taken along a partition line as described in detail hereinafter. The outer layer 38 has a slight downward slope toward the center of the pen 23 of approximately one-fourth inch for every foot, the layer 38 being about four feet in width. The next layer 39, also approximately four feet in width has a slope of about one-half inch per foot, whereas the next layer 41, also some four feet in width, has a slope of approximately three-fourths inch per foot of width. At the junction of the concrete layers 38 and 39, a post socket 42 is formed, and a post socket 43 is formed at the junction of layers 39 and 41. Referring to FIG. 5, it is seen that the inner end of layer 41 has a shelf 44 formed, and with a post socket 46 also formed therein.

Below the inner edge of the layer 41 (FIGS. 3 and 5) a trench 47 is formed (and see FIGS. 11 and 12), the sides 48 and 49 of which are spaced apart approximately five feet, and the bottom 51 of which is about five feet deep. On the inner side of the trench 47, another layer 52 of concrete approximately three feet in radial width is laid, and which then has a gradual rise of approximately one-half inch per foot. This layer 52 is contiguous with the center circular layer 53 which has a rise of approximately three-fourths inch per foot of width. The radius of the center layer 53 is about four feet. It can thus be seen that the floor 33 slopes downwardly from its periphery to the trench 47 adjacent its center, and that the central area, comprising the concrete layers 52 and 53 also slope downwardly from the center of the pen 23 outwardly toward the trench 47.

Referring to FIGS. 11 and 12 particularly, the relationship of the trench 47 to the remainder of the concrete floor 33 is seen. Furthermore, a means 54 leading radially outwardly from the trench 47 is provided for directing the livestock excretion and other sanitary flushings outwardly to a sump area 56. To aid in the flushing, the trench 47 and passage 54 slope downwardly toward the sump 56. From the sump 56, the flushings can be removed either manually or by machinery of several known types. Septic tanks or the like may be utilized.

Referring back particularly to FIG. 3, the flooring 33 of the farrowing pen 23 includes a sheet 57 of polyethylene which extends completely beneath all the concrete layers and to the outside of both walls. Furthermore, a slab 58 of styrofoam or the like is laid completely around and beneath the outer layer 38. A layer of gravel 59 (FIG. 3) is provided beneath the styrofoam slab 58 and beneath and to one side of the polyethylene sheet 57, separating these elements from the ground 32.

To provide a grate cover for the trench 47, a plurality of straight pre-formed concrete slabs 61 (FIGS. 5, 6 and 10) are provided. The slabs 61 are of approximately a five foot length sufficient to rest at each end upon a shoulder 44 (FIG. 5) of the concrete layers 41 and 52. They are also of a height and shape (FIG. 9) that their upper surfaces are flush with the surface of the adjacent floor layers 41 and 52. Additionally, their transverse width diminishes slightly from the outer end to the inner end. As seen in FIG. 9, the slabs 61 have slightly rounded top surfaces, aiding the cleaning thereof, and are each reinforced by a bar 62. By being radially spaced apart (FIG. 6) the slabs 61 form an effective grate through which the excrement of the livestock and other wastes may be flushed for drainage into and by the trench 47.

The interior of the farrowing pen 23 is divided into a plurality of identical stalls 65, one of which is seen in plan view in FIG. 6, by a plurality of fence-type identical partitions 64 and a circular gate framework 66. The framework 66 itself, is forming the inner end of the pie-shaped, radially extended, contiguous stalls 63, also forms a central area 67 (FIGS. 1 and 10). A plurality, four in number, of center gates 68, 69, 70 and 71 are all hingedly connected together at the center pole 36, and are swingable in a horizontal plane about the area 67 (FIG. 10). Each gate outer end is contiguous with the framework 66, and may be attached thereto at any location. Referring to FIG. 10, it is readily seen that four-pie-shaped center stalls 72, 73, 74 and 75 may be formed by the center gate, or they may all be swung together, as shown in dotted lines, to form one large stall.

Referring now particularly to FIGS. 3, 6, 7 and 8 each fence partition 64 comprises a wall post 80, an outer post 76, a pair of intermediate posts 77 and 78, and an upright member 79 (FIG. 3) of the framework 66. The outer post 76 is inserted into the socket 42 and extends upwardly to the roof 27 of the pen 23. The intermediate posts 77 and 78 are inserted in the sockets 43 and 46 respectively. The wall post 80 (FIG. 7) rests on the floor 33 and is secured by a trio of belts 81 extended through the side wall 26 to a vertical brace 82 on the outer side thereof.

A heavy hog wire fence 83 (FIGS. 7 and 8) is secured at one end to the post 80 and at its innermost extremity to the framework member 79. The fence 83 is supplemented by a pair of barbed wire strands 84 and 86 secured approximately two and four inches, respectively, above the floor 33. The framework 66 (FIG. 8), includes a lower horizontal tubular pipe 87 which extends completely around the pen (FIG. 10) directly above the trench slabs 61 an upper horizontal pipe 88, and the members 79 each forming the inner end of each fence. These members 87, 88 and 79 are preferably welded together. As best illustrated in FIG. 8, a gate 89 is hinged to each meber 79 and adapted to latch with the opposite member 79 so that each stall 63 has a gate 89 at its innermost end.

The arrangement of farrowing stalls 63 and center stalls 72–75 having been described, it is to be noted that an automatic watering device 91 (FIG. 10) is mounted in each circular stall 63, over the trench 47, and also that a plurality of devices 91a are also extended into the center stalls, also over the trench 47. These devices 91 and 91a are tapped into the lower framework member 87 which doubles as a water supply pipe.

As mentioned hereinbefore, the auger conveyor 24 (FIGS. 1 and 2) extends upwardly beneath the roof 27 of the farrowing pen 23. At its upper end 92, it dumps the feed into a chute 93, which directs the falling feed into a circular bin 94 mounted on the center pole 36. From the bin 94, the feed is transmitted to a horizontally disposed auger boom 96 the outer end 97 (FIG. 4) of which rides on a rail 98. By the provision of the rail 98 mounted on a plurality of braces 99, each of which is secured to a post 76, operation of the motor 101 (FIG. 2) for the boom 96 results in circular rotation of the boom 96 around the pen 23, and with a concomitant discharge of feed from the bin 94 through a spout 102 and onto the floor (see FIG. 3) of each stall 63.

Thus, it is seen that a material handling apparatus is provided wherein grain with or without protein and supplement added thereto is elevated through the roof of a farrowing pen and into the upper central portion thereof, from there the grain is dumped into a hopper or the like at one end of a horizontally disposed, radially extended auger boom which moves the grain radially outwardly for discharge at the outer end thereof, while simultaneously swinging the radially outwardly moving grain in a continually advancing circular direction to effect the distribution of a circular path of grain on the floor.

Although a preferred embodiment and method of practicing the invention has been described hereinbefore, it is to be remembered that various modifications can be made thereto without departing from the true spirit and scope of the invention as defined in the appended claims.

I claim:
1. In a livestock layout:
   a pen having a roof and a substantially circular wall;
   a floor for said pen;
   a plurality of partitions supported on said floor and forming a plurality of stalls within said pen, said stalls having inner closed ends spaced outwardly from the center of said floor and forming thereby a central floor area;
   an animal watering device mounted in each stall adjacent the inner closed end thereof; an annularly extending grate and sanitation means formed in said floor below the stalls and a watering device adjacent the inner end of said stalls for receiving and disposing of livestock excrement;
   a supporting pole mounted at the center of said floor and providing support for said roof; and
   feeding means mounted on said pole for depositing feed in each stall at the outer end thereof opposite said inner end thereof.

2. A livestock layout as defined in claim 1, and further wherein said feeding means comprises a hopper mounted on said pole for receiving feed, and a horizontally disposed circularly movable boom unit connected to said pole and operable to receive feed from said hopper, and to discharge said feed at each stall outer end.

3. A livestock layout as defined in claim 2 wherein said central floor area includes one or more gates each hingedly connected at an inner end to said pole and having an outer end contiguous with and attachable to a stall inner closed end.

References Cited by the Examiner

UNITED STATES PATENTS

| | | | |
|---|---|---|---|
| 1,466,010 | 8/1923 | Wittler | 214—16 |
| 1,486,519 | 3/1924 | Hartley | 198—100 |
| 1,967,022 | 7/1934 | Chandler | 119—54 |
| 2,243,896 | 6/1941 | Cupples | 119—51 |
| 2,735,400 | 2/1956 | Stubbs | 119—18 |
| 2,829,871 | 4/1958 | Vandenberg et al. | 119—51 X |
| 2,841,115 | 7/1958 | Weber | 119—52 |
| 3,042,000 | 7/1962 | McMurrary et al. | 119—20 |
| 3,064,833 | 11/1962 | VonRuden | 214—17 |
| 3,145,855 | 8/1964 | Plugge et al. | 214—17 |
| 3,191,577 | 6/1965 | McMurrary | 119—16 |
| 3,205,859 | 9/1965 | Fine et al. | 119—52 |

SAMUEL KOREN, *Primary Examiner.*

ALDRICH F. MEDBERY, *Examiner.*